US006977922B2

(12) United States Patent
Blanset et al.

(10) Patent No.: US 6,977,922 B2
(45) Date of Patent: Dec. 20, 2005

(54) SYSTEMS AND METHODS FOR AUTOMATICALLY CONFIGURING CROSS-CONNECTIONS IN A DIGITAL SUBSCRIBER LINE ACCESS MULTIPLEXER (DSLAM)

(75) Inventors: David Blanset, Lincroft, NJ (US); Timothy J. Tierney, Morganville, NJ (US); Edward W. Landis, Holmdel, NJ (US); Prakash Easwar, Somerset, NJ (US)

(73) Assignee: Paradyne Corporation, Largo, FL (US)

( * ) Notice: Subject to any disclaimer, the term of this patent is extended or adjusted under 35 U.S.C. 154(b) by 1027 days.

(21) Appl. No.: 09/735,093

(22) Filed: Dec. 12, 2000

(65) Prior Publication Data

US 2001/0015978 A1 Aug. 23, 2001

Related U.S. Application Data

(66) Substitute for application No. 60/237,148, filed on Dec. 1, 2000.

(51) Int. Cl.[7] ........................................ H04L 12/66
(52) U.S. Cl. .............................. 370/352; 370/395.1
(58) Field of Search .......................... 370/352, 353, 370/395.1, 395.6, 395.61, 397, 399, 466

(56) References Cited

U.S. PATENT DOCUMENTS

| | | | | | |
|---|---|---|---|---|---|
| 6,081,517 | A | * | 6/2000 | Liu et al. | 370/352 |
| 6,084,881 | A | * | 7/2000 | Fosmark et al. | 370/397 |
| 6,130,879 | A | * | 10/2000 | Liu | 370/230 |
| 6,141,339 | A | * | 10/2000 | Kaplan et al. | 370/395.61 |
| 6,349,096 | B1 | * | 2/2002 | Liu et al. | 370/352 |
| 6,490,273 | B1 | * | 12/2002 | DeNap et al. | 370/352 |
| 6,493,348 | B1 | * | 12/2002 | Gelman et al. | 370/401 |
| 6,529,479 | B1 | * | 3/2003 | Suzuki | 370/236.1 |
| 6,546,089 | B1 | * | 4/2003 | Chea, Jr. et al. | 379/93.06 |
| 6,574,313 | B1 | * | 6/2003 | Chea, Jr. et al. | 379/93.09 |
| 6,643,253 | B1 | * | 11/2003 | Smith | 370/217 |
| 6,661,795 | B1 | * | 12/2003 | Adas et al. | 370/395.1 |
| 6,667,971 | B1 | * | 12/2003 | Modarressi et al. | 370/352 |
| 6,680,904 | B1 | * | 1/2004 | Kaplan et al. | 370/395.1 |
| 6,711,162 | B1 | * | 3/2004 | Ortega et al. | 370/389 |
| 6,714,516 | B1 | * | 3/2004 | Todd | 370/235 |
| 6,771,763 | B1 | * | 8/2004 | Hagirahim et al. | 379/219 |

* cited by examiner

*Primary Examiner*—Chi Pham
*Assistant Examiner*—Blanche Wong
(74) *Attorney, Agent, or Firm*—Thomas, Kayden, Horstemeyer & Risley, LLP

(57) ABSTRACT

Systems and methods are provided for automatically configuring cross-connects in a switch. One exemplary embodiment is a digital subscriber line access multiplexer for automatically configuring a plurality of cross-connects comprising: obtaining a default logical VPI/VCI address associated with the plurality of data communications channels; defining a first plurality of unique logical VPI/VCI addresses based on a predefined set of rules for incrementing logical VPI/VCI addresses, each of the first plurality of unique logical VPI/VCI addresses associated with one of the plurality of digital subscriber line communications channels; determining a second plurality of unique logical VPI/VCI addresses based on the default logical VPI/VCI address and the predefined set of rules; and creating signal connectivity between the plurality of data communications channels and the plurality of digital subscriber line communications channels by linking the first and second unique logical VPI/VCI addresses.

63 Claims, 18 Drawing Sheets

| 144 LINE CARD STRUCTURE | VALUE |
|---|---|
| 146 SLOT # | |
| 148 NUMBER OF PORTS | |
| 150 REQUESTED NUMBER OF CHANNELS PER PORT | |
| 152 REQUESTED TRAFFIC PROFILE INDICATOR PER CHANNEL | |

FIG. 9

| 154 DSL PORT STRUCTURE | VALUE |
|---|---|
| 156 DSL PORT # | |
| 158 MAX VPI | |
| 160 MAX VCI | |
| 162 STATUS | |
| 164 CONFIGURATION PARAMETERS (3 channels, ATM parameters, upstream and downstream rate table, etc.) | |

FIG. 10

| | BACKPLANE INTERFACE STRUCTURE | VALUE |
|---|---|---|
| 166 | **BACKPLANE INTERFACE STRUCTURE** | **VALUE** |
| 168 | INTERFACE ID | |
| 170 | MAX VPI | |
| 172 | MAX VCI | |
| 174 | STATUS | |
| 176 | OTHER PARAMETERS | |

FIG. 11

| | UPLINK INTERFACE STRUCTURE | VALUE |
|---|---|---|
| 178 | **UPLINK INTERFACE STRUCTURE** | **VALUE** |
| 180 | INTERFACE ID | |
| 182 | MAX VPI | |
| 184 | MAX VCI | |
| 186 | STATUS | |
| 188 | OTHER PARAMETERS | |

FIG. 12

| | CROSS-CONNECT STRUCTURE | VALUE |
|---|---|---|
| 190 | | |
| 192 | CROSS CONNECT ID | |
| 194 | IFINDEX1 | |
| 196 | VPI1 | |
| 198 | VCI1 | |
| 200 | IFINDEX2 | |
| 202 | VPI2 | |
| 206 | VCI2 | |

FIG. 13

210 CROSS-CONNECTION TABLE

| 212 UPLINK INTERFACE:VPI:VCI<br>[UPLINK INTERFACE = Ifup = 1]<br>[VPI0 ≤ VPI ≤ VPIm]<br>[VCI0 ≤ VCI ≤ VCIm]<br>[p = number of ports per card]<br>[c = number of cards in system] | 216 STATUS | 214 BACKPLANE INTERFACE:VPI:VCI<br>[IF1 ≤ BACKPLANE INTERFACE ≤ IFc]<br>[VPI0 = fixed starting VPI]<br>[VCI0 fixed starting VCI]<br>[p = number of ports per card]<br>[c = number of cards in system] |
|---|---|---|
| | | |
| IFup:VPI0:VCI0 | | IF1:VPI0:VCI0 |
| IFup:VPI0:VCI0+1 | | IF1:VPI0+1:VCI0 |
| . | | . |
| IFup:VPI0:VCI0+p-2 | | IF1:VPI0+p-2:VCI0 |
| IFup:VPI0:VCI0+p-1 | | IF1:VPI0+p-1:VCI0 |
| IFup:VPI0:VCI0+p | | IF2:VPI0/ VCI0 |
| IFup:VPI0:VCI0+p+1 | | IF2:VPI0+1:VCI0 |
| . | | . |
| IFup:VPI0:VCI0+p*2-2 | | IF2:VPI0+p-2:VCI0 |
| IFup:VPI0:VCI0+p*2-1 | | IF2:VPI0+p-1:VCI0 |
| . | | . |
| IFup:VPI0:VCI0+p*(c-2) | | IF2:VPI0/ VCI0 |
| IFup:VPI0:VCI0+p*(c-2)+1 | | IF2:VPI0+1:VCI0 |
| . | | . |

FIG. 14A

210 CROSS-CONNECTION TABLE

| 212 UPLINK INTERFACE:VPI:VCI [UPLINK INTERFACE = Ifup = 1] [VPI0 ≤ VPI ≤ VPIm] [VCI0 ≤ VCI ≤ VCIm] [p = number of ports per card] [c = number of cards in system] | 216 STATUS | 214 BACKPLANE INTERFACE:VPI:VCI [IF1 ≤ BACKPLANE INTERFACE ≤ IFc] [VPI0 = fixed starting VPI] [VCI0 fixed starting VCI] [p = number of ports per card] [c = number of cards in system] |
|---|---|---|
| IFup:VPI0:VCI0+p*(c-1)-2 | | IFc:VPI0+p-2:VCI0 |
| IFup:VPI0:VCI0+p*(c-1)-1 | | IFc:VPI0+p-1:VCI0 |
| IFup:VPI1:VCI1 | | IF1:VPI0:VCI1 |
| IFup:VPI1:VCI1+1 | | IF1:VPI0+1:VCI1 |
| . | | . |
| IFup:VPI1:VCI1+p-2 | | IF1:VPI0+p-2:VCI1 |
| IFup:VPI1:VCI1+p-1 | | IF1:VPI0+p-1:VCI1 |
| IFup:VPI1:VCI1+p | | IF2:VPI0/ VCI1 |
| IFup:VPI1:VCI1+p+1 | | IF2:VPI0+1:VCI1 |
| . | | . |
| IFup:VPI1:VCI1+p*(c-2) | | IF2:VPI0/ VCI1 |
| IFup:VPI1:VCI1+p*(c-2)+1 | | IF2:VPI0+1:VCI1 |
| . | | . |

CROSS-CONNECTION TABLE

| 212 UPLINK INTERFACE:VPI:VCI [UPLINK INTERFACE = Ifup = 1] [VPI0 ≤ VPI ≤ VPIm] [VCI0 ≤ VCI ≤ VCIm] [p = number of ports per card] [c = number of cards in system] | 216 STATUS | 214 BACKPLANE INTERFACE:VPI:VCI [IF1 ≤ BACKPLANE INTERFACE ≤ IFc] [VPI0 = fixed starting VPI] [VCI0 fixed starting VCI] [p = number of ports per card] [c = number of cards in system] |
|---|---|---|
| IFup:VPI1:VCI1+p*(c-1)-2 | | IFc:VPI0+p-2:VCI1 |
| IFup:VPI1:VCI1+p*(c-1)-1 | | IFc:VPI0+p-1:VCI1 |
| . | | . |
| IFup:VPIm:VCIm | | IF1:VPI0:VCIc-1 |
| IFup:VPIm:VCIm+1 | | IF1:VPI0+1:VCIc-1 |
| . | | . |
| IFup:VPIm:VCIm+p-2 | | IF1:VPI0+p-2:VCIc-1 |
| IFup:VPIm:VCIm+p-1 | | IF1:VPI0+p-1:VCIc-1 |
| IFup:VPIm:VCIm+p | | IF2:VPI1/ VCIc-1 |
| IFup:VPIm:VCIm+p+1 | | IF2:VPI2:VCIc-1 |
| . | | . |
| IFup:VPIm:VCIm+p*(c-2) | | IF2:VPI0/ VCI0 |
| IFup:VPIm:VCIm+p*(c-2)+1 | | IF2:VPI0+1:VCI0 |

FIG. 14C

| 220 VCL STRUCTURE | VALUE |
|---|---|
| 222 IFINDEX | |
| 224 VPI | |
| 226 VCI | |
| 228 TRAFFIC PROFILE UP | |
| 230 TRAFFIC PROFILE DOWN | |

FIG. 15

| 232 AUTO- CONFIGURATION RECORD | |
|---|---|
| AUTO-CONFIGURATION VARIABLE | VALUE |
| 234 INTERFACE ID | |
| 236 CHANNEL | |
| 238 BASE VPI | |
| 240 BASE VCI | |

FIG. 16

SYSTEMS AND METHODS FOR AUTOMATICALLY CONFIGURING CROSS-CONNECTIONS IN A DIGITAL SUBSCRIBER LINE ACCESS MULTIPLEXER (DSLAM)

CROSS-REFERENCE TO RELATED APPLICATIONS

This application is related to U.S. Provisional Application entitled "Automatic Cross Connect Configuration in a DSLAM and Extensions for Class of Service and Scaling," filed on Oct. 2, 2000 and accorded Ser. No. 60/237,148, which is hereby incorporated by reference, and to U.S. Provisional Application entitled "Systems and Methods for Automatically Configuring Cross-Connections in a Digital Subscriber Line Access Multiplexer (DSLAM)," filed on Dec. 1, 2000 and accorded Ser. No. 60/250,494, which is hereby incorporated by reference.

FIELD OF THE INVENTION

The present invention relates generally to a digital subscriber line access multiplexer (DSLAM), and more particularly, to systems and methods for automatically configuring cross-connections in a DSLAM.

BACKGROUND OF THE INVENTION

Digital subscriber line (DSL) technologies have become a widely-used solution for providing high bit rate transmission over the existing copper wire infrastructure, known as the "subscriber loop." DSL technologies dramatically improve the bandwidth of the existing analog telephone system. DSL enhances the data capacity of the existing copper wire that runs between the local telephone company switching offices and most homes and offices. The bandwidth of the wire is limited to approximately 3,000 Hz due to its primary use as a voice telephone system. While the wire itself can handle higher frequencies, the telephone switching equipment is designed to cut-off signals above 4,000 Hz to filter noise off the voice line. DSL enables high-speed data traffic from a service provider network, such as an ATM network, to be provided on the existing wires with voice traffic.

In order to provide DSL service, a digital subscriber line access multiplexer (DSLAM) is employed at the local telephone company central office or digital loop carrier (DLC) to separate the voice-frequency traffic provided by the public-switched telephone network (PSTN) from the high-speed data traffic service provided by the network service provider. A DSLAM concentrates the high-speed data traffic and routes it to subscribers on twisted-pair wires, referred to as a local loop. Many DSLAMs are designed to work with ATM networks.

Generally, a DSLAM includes an uplink interface, a switch concentration module (SCM), a backplane interface, and multiple line cards. High-speed data traffic from an ATM network is received by the uplink interface via multiple data communications channels. The high-speed data traffic is then transmitted to the SCM where it is transmitted to the backplane interface. The backplane interface provides the high-speed data traffic to multiple DSL ports in the line cards for subsequent delivery to subscribers.

As will be described in more detail below, in order to establish an ATM connection through the DSLAM, each node must be provisioned with matching ATM virtual channel information or virtual path identifier (VPI)/virtual circuit identifier (VCI) addresses. With existing DSLAMs, for each connection through the DSLAM, a VPI/VCI address must be configured on each node to match the VPI/VCI addresses corresponding to the data communications channels received from the external ATM network. This manual configuration of multiple VPI/VCI addresses within the DSLAM is very time consuming and costly.

Thus, a heretofore unaddressed need exists in the industry to address these aforementioned deficiencies and inadequacies by automatically configuring ATM cross-connects in a DSLAM between a plurality of digital subscriber line channels and a plurality of data communications channels provided from an ATM service provider.

SUMMARY OF THE INVENTION

The present invention provides a system and method for automatically configuring ATM cross-connects in an ATM-based switch between a plurality of network-side communications channels provided from an ATM network and a plurality of user-side communications channels associated with a plurality of user ports.

Briefly described, in architecture, the switch comprises a means for receiving a plurality of network-side communications channels, a means for receiving a plurality of user-side communications channels, and a means for automatically configuring a plurality of cross-connects between the plurality of network-side communications channels and the plurality of user-side communications channels. The means for automatically configuring the plurality of cross-connects may comprise a means for obtaining a default logical VPI/VCI address associated with the plurality of network-side communications channels, a means for defining a first plurality of unique logical VPI/VCI addresses based on a predefined set of rules for incrementing logical VPI/VCI addresses, each of the first plurality of unique logical VPI/VCI addresses associated with one of the plurality of user-side communications channels, a means for determining a second plurality of unique logical VPI/VCI addresses based on the default logical VPI/VCI address and the predefined set of rules, and a means for creating signal connectivity between the plurality of network-side communications channels and the plurality of user-side communications channels by linking the first and second unique logical VPI/VCI addresses. The switch may further comprise a means for detecting a user port, the user port associated with one of a portion of the plurality of user-side communications channels, a means for specifying one of the first and second plurality of unique logical VPI/VCI addresses as a base logical VPI/VCI address for each of a plurality of types of channels, a means for associating each type of channel for the user port with one of the first plurality of unique logical VPI/VCI addresses.

The present invention can also be viewed as providing methods for automatically configuring a plurality of cross-connects in an ATM-based switch between a plurality of network-side communications channels and a plurality of user-side communications channels.

Briefly, one such method involves (1) obtaining a default logical VPI/VCI address associated with the plurality of network-side communications channels, (2) defining a first plurality of unique logical VPI/VCI addresses based on a predefined set of rules for incrementing logical VPI/VCI addresses, each of the first plurality of unique logical VPI/VCI addresses associated with one of the plurality of user-side communications channels, (3) determining a second plurality of unique logical VPI/VCI addresses based on the default logical VPI/VCI address and the predefined set of rules, and (4) creating a plurality of cross-connects between the plurality of user-side communications channels and the plurality of network-side communications channels by linking the first and second unique logical VPI/VCI addresses and defining the plurality of cross-connects as being in an autodown state. The method may further involve (5) detecting a plurality of user ports, each of the plurality of user ports associated with one of a portion of the plurality of user-side communications channels, (6) specifying one of the first and second plurality of unique logical VPI/VCI addresses as a base logical VPI/VCI address for each of a plurality of types of channels, (7) associating each type of channel for each user port with one of the first plurality of unique logical VPI/VCI addresses, and (8) changing the state of each of the plurality of cross-connects corresponding to each of the first plurality of unique logical VPI/VCI addresses associated with each type of channel for each user port to an up state.

The present invention can also be viewed as a computer-readable medium having a computer program for use by an ATM switch for automatically configuring a plurality of cross-connects between a plurality of network-side communications channels and a plurality of user-side communications channels. The computer-readable medium may include the steps of the methods of the present invention as an ordered listing of executable instructions for implementing logical functions related to automatically configuring the ATM cross-connects. The list of executable instructions for automatically configuring the ATM cross-connects, which are embodied in the computer-readable medium, may be used by or in connection with an instruction execution system, apparatus, or device, such as a computer-based system, processor-containing system, or other system that can fetch the instructions from the instruction execution system, apparatus, or device and execute the instructions.

Other systems, methods, features, and advantages of the present invention will be or become apparent to one with skill in the art upon examination of the following drawings and detailed description. It is intended that all such additional systems, methods, features, and advantages included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 9 is a line card data structure of a line card table for use by the switch concentration module in FIG 7.

FIG. 10 is a DSL port data structure of a DSL port table for use by the switch concentration module in FIG 7.

FIG. 11 is a backplane interface data structure of a backplane interface table for use by the switch concentration module in FIG 7.

FIG. 12 is an uplink interface data structure of an uplink interface table for use by the switch concentration module in FIG 7.

FIG. 13 is a cross-connect data structure of a cross-connect table for use by the switch concentration module in FIG. 7.

FIG. 14A is one portion of a cross-connection table for use by the switch concentration module in FIG. 7.

FIG. 14B is one portion of a cross-connection table for use by the switch concentration module in FIG. 7.

FIG. 14C is one portion of a cross connect cross-connection table for use by the switch concentration module in FIG. 7.

FIG. 15 is a virtual circuit link (VCL) data structure of a virtual circuit link table for use by the switch concentration module in FIG 7.

FIG. 16 is an auto-configuration record for use by the switch concentration module in FIG 7.

DETAILED DESCRIPTION OF THE PREFERRED EMBODIMENT

Figure 1:
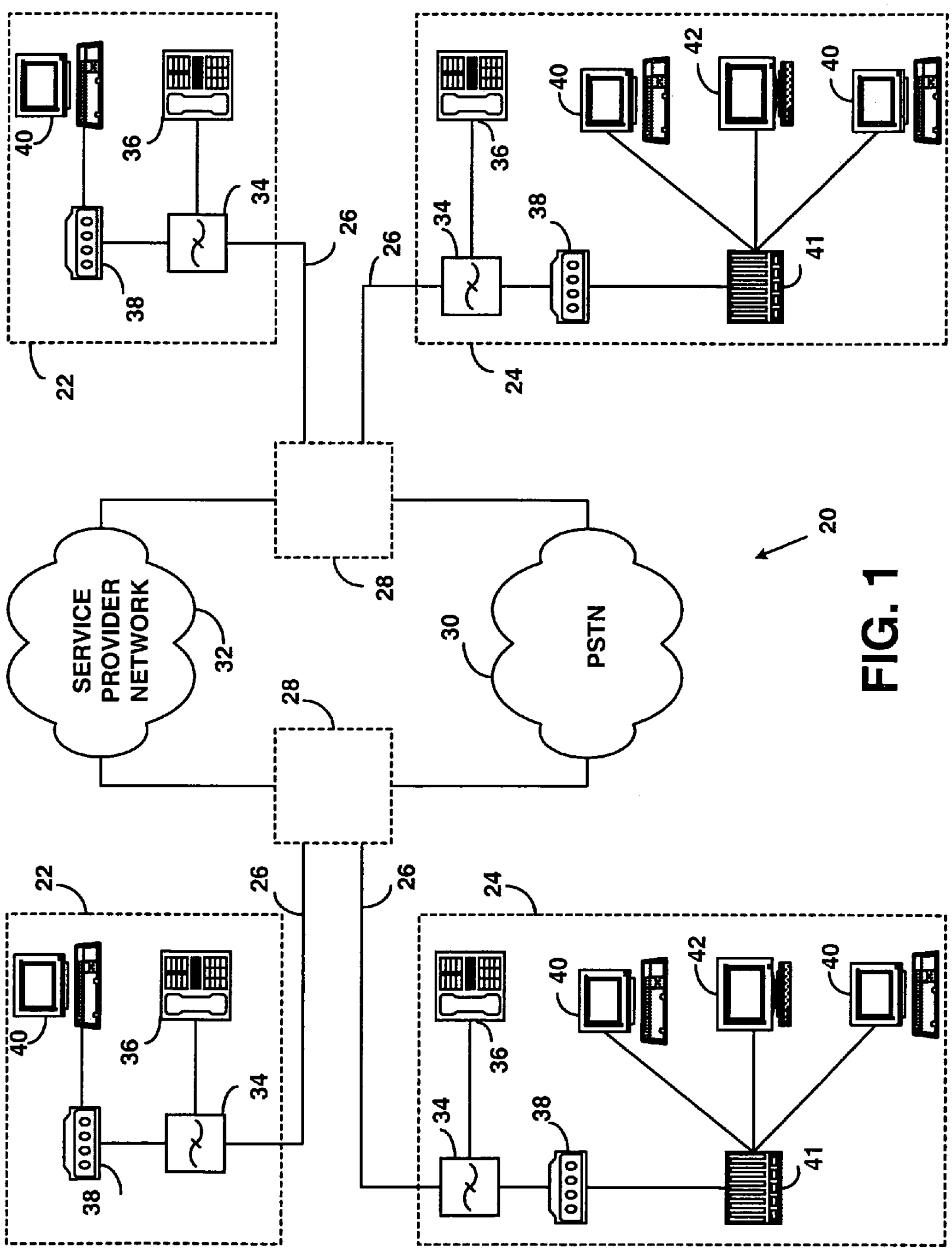
FIG. 1 is a block diagram illustrating one embodiment of a system for implementing the present invention.

Having summarized the invention above, reference is now made in detail to the description of the invention as illustrated in the drawings. While the invention will be described in connection with these drawings, there is no intent to limit it to the embodiment or embodiments disclosed. On the contrary, the intent is to cover all alternatives, modifications and equivalents included within the spirit and scope of the invention as defined by the appended claims.

I. System Overview

FIG. 1 illustrates a functional block diagram of one embodiment of a DSL system 20 for providing DSL-based services in which the systems and methods of the present invention may be employed. DSL system 20 includes residential subscribers 22, commercial subscribers 24, local digital subscriber line (DSL) loops 26, central offices 28, public switched telephone network (PSTN) 30, and service provider network 32. Subscribers 22 and 24 are coupled to a central office 28 via a local DSL loop 26. Central offices 28 are connected to PSTN 30 and service provider network 32.

As described in more detail below, service provider network 32 may be a cell-based network, such as an ATM network.

DSL system 20 enables a residential subscriber 22 and/or a commercial subscriber 24 to receive traditional voice-frequency services, as well as, high-speed data services over the same DSL loop 26. A DSL loop 26 is a traditional twisted-pair of copper wires that extends between central office 28 and a residential subscriber 22 and/or a commercial subscriber 24. Traditional voice-frequency services are provided by central office 28 via PSTN 30, while high-speed data services are provided via service provider network 32.

Residential subscribers 22 may be any residential entity having a twisted-pair copper connection from their premises to a central office 28. Commercial subscribers 24 may be any commercial entity, such as, for example, a business, a government agency, a hospital, a school, a university, or any other entity having a twisted-pair copper connection from their premises to a central office.

In order to enable DSL-based services, residential subscribers 22 employ at their premises a filter 34, a telephone 36, a DSL remote transceiver unit 38, and a computer 40. Commercial subscribers 24 may employ at their premises a filter 34, a telephone 36, a DSL remote transceiver unit 38, a network hub 41, a computer 40, and a workstation 42. Although FIG. 1 differentiates between residential subscribers 22 and commercial subscribers 24, it should be understood that the systems and methods of the present invention are not dependent upon or limited by the type of subscriber receiving the DSL-based services.

Filter 34 may be any standard plain old telephone service (POTS) splitter or any similar device capable of separating voice-frequency traffic from high-speed data traffic provided on a DSL loop 26 carrying both. Filter 34 is coupled to DSL loop 26. Tn operation, filter 34 receives voice-frequency traffic and high-speed data traffic as input from DSL loop 26 and provides the voice-frequency traffic to telephone 36 and the high-speed data traffic to DSL remote transceiver unit 38. Telephone 36 may be any conventional or future telephone or any similar device capable of converting sounds, such as voice, into analog data and transmitting the analog data over a DSL loop 26. DSL remote transceiver unit 38 functions as a DSL modem that provides the high-speed data traffic to computer 40. In the commercial subscriber environment, DSL remote transceiver unit 38 is coupled to a network hub 41, which supports a network of computers 40 and workstations 42. Computer 40 and workstation 42 may be any computer capable of receiving high-speed data traffic from a DSL loop 26. Those of ordinary skill in the art should understand that, although telephone 36 and computer 40 and workstation 42 are represented by different elements in FIG. 1, this invention contemplates combining telephone 36 with computer 40 and/or workstation 42. For purposes of this invention, the important aspect is that, because DSL loop 26 carries both voice-frequency traffic and high-speed data traffic, filter 34 separates the voice-frequency traffic and the high-speed data traffic at the premises of residential subscriber 22 and/or commercial subscriber 24 to enable both voice services and high-speed data services.

In accordance with the systems and methods of the present invention, DSL system 20 may provide any of a number of DSL-based services to a residential subscriber 22 and/or a commercial subscriber 24 via DSL loop 26. For example, DSL system 20 may provide high-bit-rate digital subscriber line (HDSL) services. HDSL provides T1data rates of 1.544 Mbits/sec over DSL loops 26 that are up to 3.6 kilometers in length. Generally, HDSL is a T1service that requires no repeaters, but does use two DSL loops 26. In HDSL, voice telephone services cannot operate on the same DSL loop 26. HDSL services are generally not used for residential subscribers 22, but instead are used by the operator of central office 26 as feeder lines, interexchange connections, Internet servers, or private data networks to commercial subscribers 24.

DSL system 20 may also provide symmetrical digital subscribe line (SDSL) services. SDSL is a symmetrical, bi-directional DSL service that is basically the same as HDSL but operates on one twisted-pair wire. It can provide data rates up to the T1 rate of 1.544 Mbits/sec, and it operates above the voice frequency, so voice and data can be carried on the same wire.

DSL system 20 may also provide asymmetrical digital subscriber line (ADSL) services. ADSL is the most common DSL service. It is an asymmetrical technology, meaning that the downstream data rate is much higher than the upstream rate. This type of service works well for providing typical Internet services to residential subscribers 22. ADSL operates in a frequency range that is above the frequency range of voice services, so the two systems can operate over the same subscriber cable.

DSL system 20 may also provide very high-bit-rate digital subscriber line (VDSL) services. VDSL is basically ADSL at much higher data rates. It is asymmetrical and thus has a higher downstream rate than upstream rate. VDSL service can be used on the same DSL loop 26 as the voice telephone network and ISDN. The upstream rates are from 1.6 Mbits/sec to 2.3 Mbits/sec.

DSL system 20 may also provide rate-adaptive digital subscriber line (RADSL) services. This service is similar to ADSL, but it has a rate-adaptive feature that will adjust the transmission speed to match the quality of DSL loop 26 and the length of DSL loop 26. A line-polling technique is used to establish a connection speed when the line is first established.

It should be understood by one of ordinary skill in the art that the systems and methods of the present invention are not dependent on or limited by the type of DSL service provided to residential subscribers 22 and/or commercial subscribers 24. These are merely examples of common DSL services that may be implemented.

Figure 2:
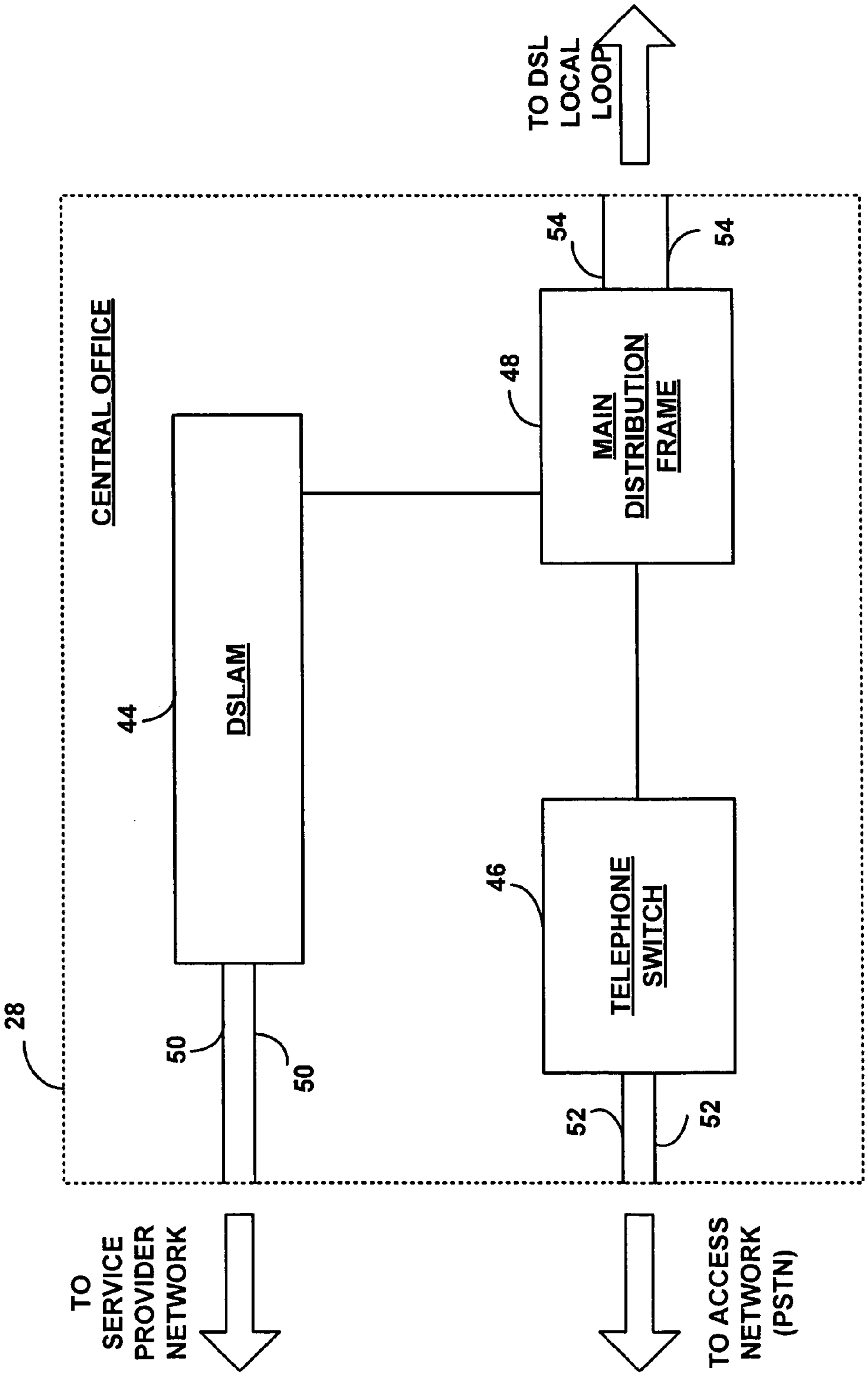
FIG. 2 is a block diagram illustrating the components of the central office in the system of FIG. 1.

FIG. 2 illustrates the components of one embodiment of a central office 28 in DSL system 20 of FIG. 1 for implementing the systems and methods of the present invention. Central office 28 includes a DSLAM 44, a telephone switch 46, a main distribution frame 48, a plurality of communications channels 50 adapted to communicate with service provider network 32, a plurality of communications channels 52 adapted to communicate with PSTN 30, and a plurality of communications channels 54 adapted to communicate with DSL loops 26. DSLAM 44 is coupled to communications channels 50 and main distribution frame 48. Telephone switch 46 is coupled to communications channels 52 and main distribution frame 48. Main distribution frame 48 is coupled to communications channels 54 and DSLAM 44.

In operation, high-speed data traffic from service provider network 32 is received at central office 28 by DSLAM 44 via communications channels 50. Voice-frequency traffic is received at central office 28 by telephone switch 46 via communications channels 52. As described above, DSL system 20 provides both the voice-frequency traffic and the high-speed data traffic from central office 28 to residential subscribers 22 and/or commercial subscribers 24 via DSL loops 26. DSLAM 44 enables the high-speed data traffic to bypass telephone switch 46. DSLAM 44 concentrates the high-speed data traffic and routes it to main distribution frame 48. Main distribution frame 48 receives the high-speed data traffic from DSLAM 44 and the voice-frequency traffic from telephone switch 46 and provides both types of traffic to communications channels 54 for subsequent delivery to residential subscribers 22 and commercial subscribers 24.

DSLAM 44 may be a DSLAM or some other type of access multiplexer. As will be described in detail below, DSLAM 44 may be a general purpose ATM switch.

II. DSLAM Components

Figure 3:
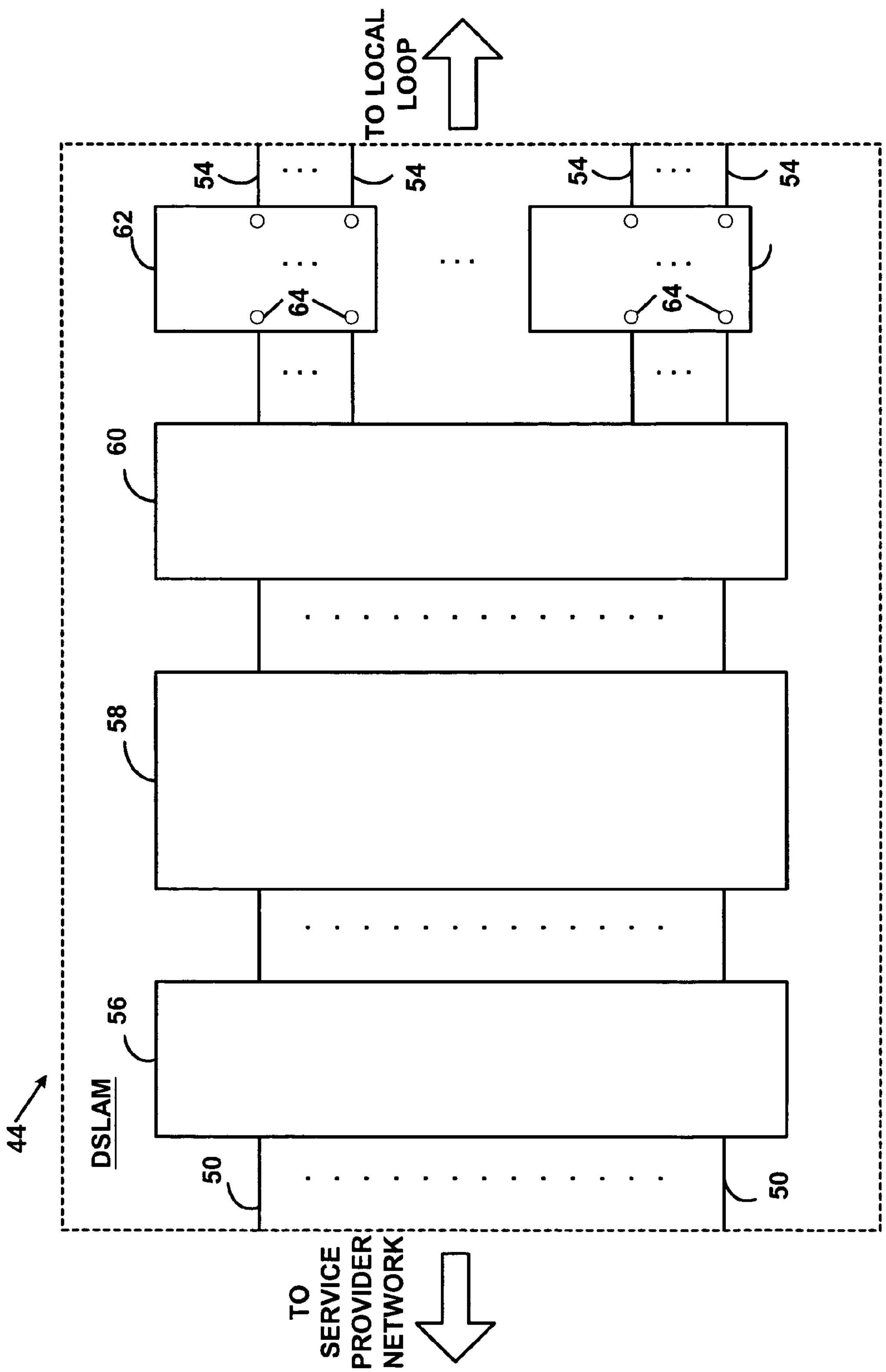
FIG. 3 is a block diagram illustrating one embodiment of a DSLAM according to the present invention.

FIG. 3 illustrates the components of one embodiment of a DSLAM 44 in central office 28 of FIG. 2 for implementing the systems and methods of the present invention. DSLAM 44 includes an uplink interface 56, a switch concentration module (SCM) 58, a backplane interface 60, and a plurality of line cards 62. Uplink interface 56 is coupled to communications channels 50, which carry the high-speed data traffic from service provider network 32, and SCM 58. Line cards 62 are coupled to communications channels 54, which communicate with DSL loops 26 (FIG. 2), and backplane interface 60. Backplane interface 60 is coupled to SCM 58.

Uplink interface 56 may be any type of interface to a wide-area transmission medium, such as a fiber-based (OC3), coaxial (DS3), or any other known or future type of wide-area transmission medium.

Backplane interface 60 may be a proprietary interface to line cards 62. In alternative embodiments, backplane interface 60 may be any type of interface to a wide-area transmission medium, such as a fiber-based (OC3), coaxial (DS3), or any other known or future type of wide-area transmission medium.

Each line card 62 includes a plurality of DSL ports 64. Each DSL port 64 corresponds to a DSL loop 26 connected to a residential subscriber 22 or a commercial subscriber 24.

In operation, high-speed data traffic from service provider network 32 (FIG. 1) is received at DSLAM 44 by uplink interface 56 via communications channels 50. Each communication channel 50 terminates at a link in uplink interface 56. The high-speed data traffic is then transmitted to SCM 58 where it is transmitted to links in backplane interface 60. Backplane interface 60 provides the high-speed data traffic to DSL ports 64 in line cards 62 for subsequent delivery to residential subscribers 22 and commercial subscribers 24 over DSL loops 26.

III. ATM Service Provider Network

Figure 4:
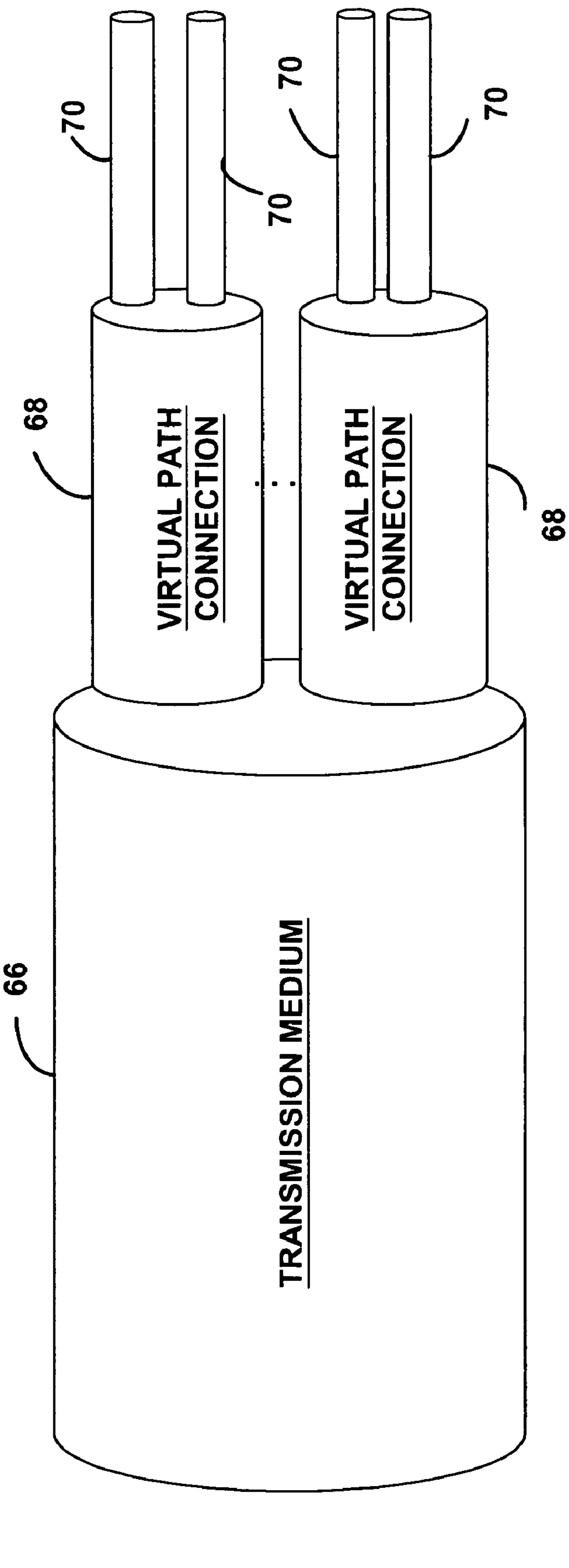
FIG. 4 is a perspective view of an asynchronous transfer mode (ATM) transmission medium illustrating one embodiment for transmitting the data communications channels and the digital subscriber line communications channels of the DSLAM in FIG. 3.
Figure 6:
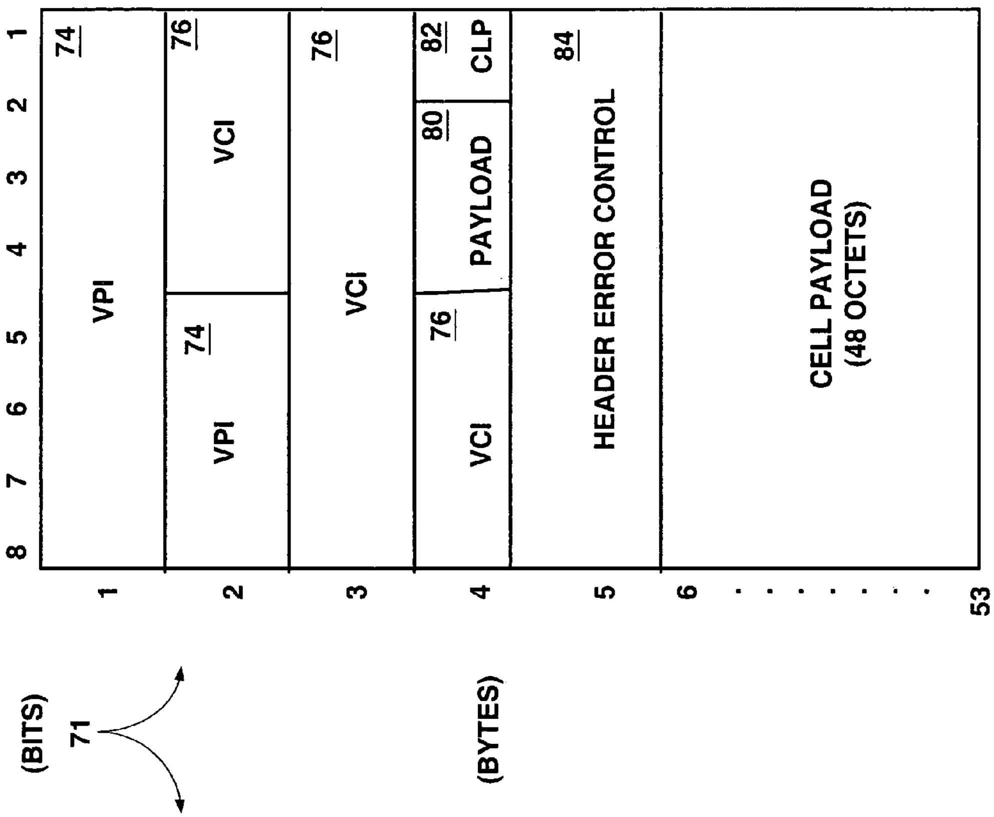
FIG. 6 is a network node interface (NNI) data structure for an ATM cell transmitted on the transmission medium of FIG. 4.
Figure 5:
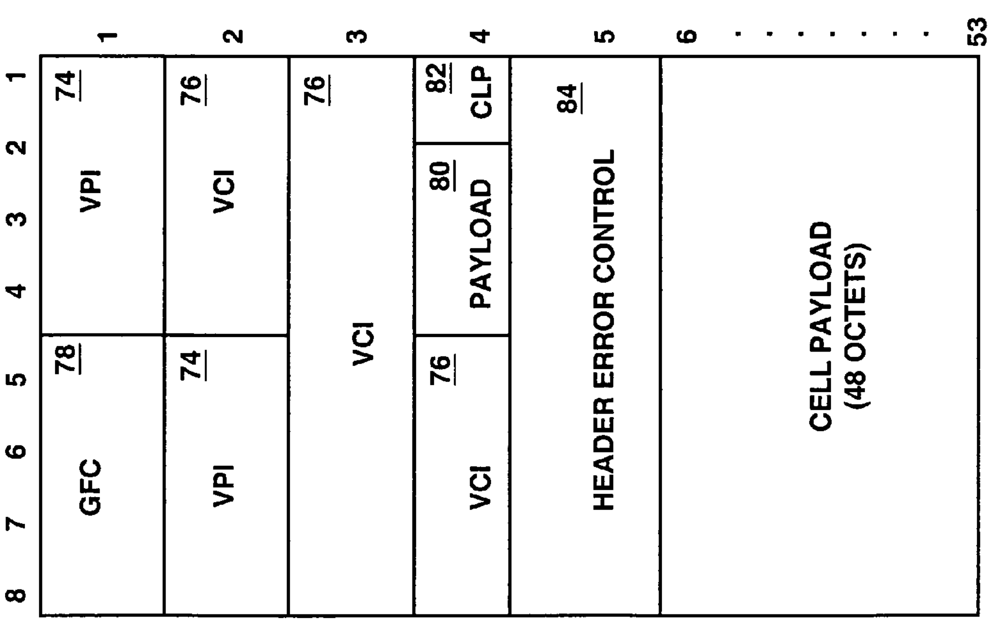
FIG. 5 is a user-network interface (UNI) data structure for an ATM cell transmitted on the transmission medium of FIG. 4.

Referring to FIGS. 4–6, in the preferred embodiment of the present invention, service provider network 32 (FIG. 1) is an ATM network. Various ATM standards and specifications exist for implementing various aspects of ATM networks. Although many of these aspects are known to one of ordinary skill in the art, they are introduced here for clarity and completeness. FIG. 4 illustrates an ATM transmission medium 66 for transmitting the high-speed data traffic on communications channels 50 and 54 data communications through DSLAM 44 (FIG. 2). Data is routed through an ATM network based on virtual path connections (VPCs) 68 and virtual channel connections (VCCs) 70. VPCs 68 and VPCs 70 exist across a node in the ATM network. A virtual path link (VPL) or a virtual channel link (VCL) can exist between connecting nodes in the ATM network. A VPC or VCC is an ordered list of pairs of VPLs or VCLs, respectively.

ATM data is transmitted through an ATM network as 53-byte cells. FIG. 5 illustrates the format of the 53-byte ATM cell at the user-network interface (UNI). Cell header 71 contains a logical address in two parts: an 8-bit virtual path identifier (VPI) 74 and a 16-bit virtual channel identifier (VCI) 76. The cell header 71 also contains a 4-bit generic flow control (GFC) 78, 3-bit payload type (PT) 80, and a 1-bit cell loss priority (CLP) indicator 82. The entire header 71 is error-protected by a 1-byte header error control (HEC) field 84.

FIG. 6 illustrates the format of the 53-byte ATM cell at the network node interface (NNI). The format is identical to the UNI format with two exceptions. First, there is no GFC 78. FIG. 5). Secondly, the NNI uses the 4 bits used for GFC 78 at the UNI to increase the VPI 74 to 12 bits at the NNI as compared to 8 bits at the UNI.

IV. Switch Concentration Module

As described above, in the preferred embodiment of the present invention, service provider network 32 is an ATM network. A fundamental concept of ATM is that switching occurs based upon the VPI/VCI fields of each cell. Switching done on VPI 74 only is called a VPC, while switching done on both the VPI 74 and VCI 76 is called a VCC.

Referring again to FIG. 3, DSLAM 44 functions as an ATM cross-connect. Thus, in order to establish an ATM connection through DSLAM 44, uplink interface 56, SCM 58, and backplane interface 60 must be provisioned with matching VPIs 74 and VCIs 76. In accordance with the systems and methods of the present invention, DSLAM 44 automatically configures cross-connects between communications channels 50 from service provider network 32 and communications channels 54 from DSL loops 26.

Figure 7:
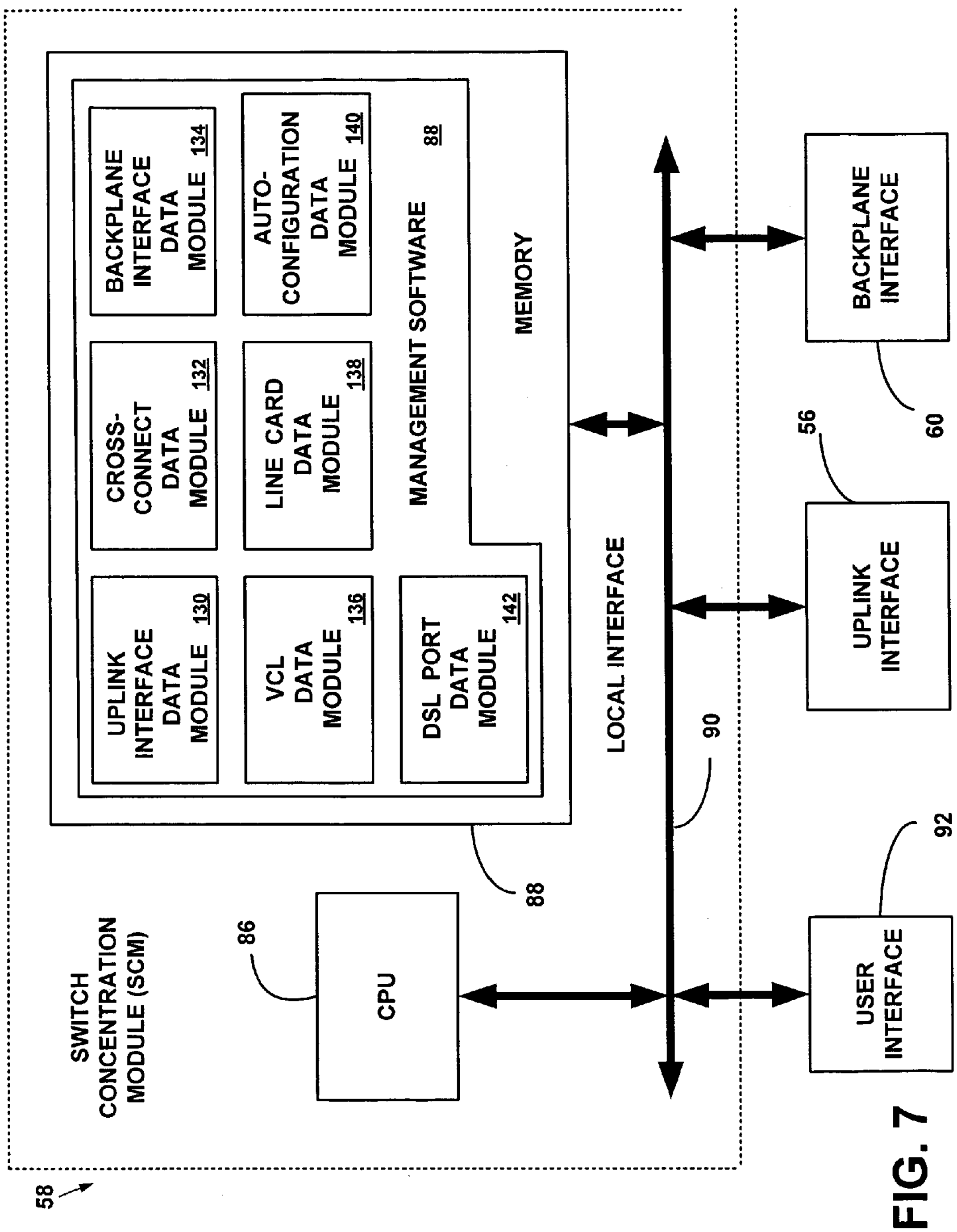
FIG. 7 is a block diagram illustrating the components of the switch concentration module in the DSLAM of FIG. 3.

FIG. 7 illustrates the components of SCM 58 in DSLAM 44 of FIG. 3. SCM 58 includes central processing unit (CPU) 86, memory 88, and local interface 90. Local interface 90 links CPU 86, memory 88, uplink interface 56, backplane interface 60, and a user interface 92. Memory 88 comprises management software 100.

Figure 8A:
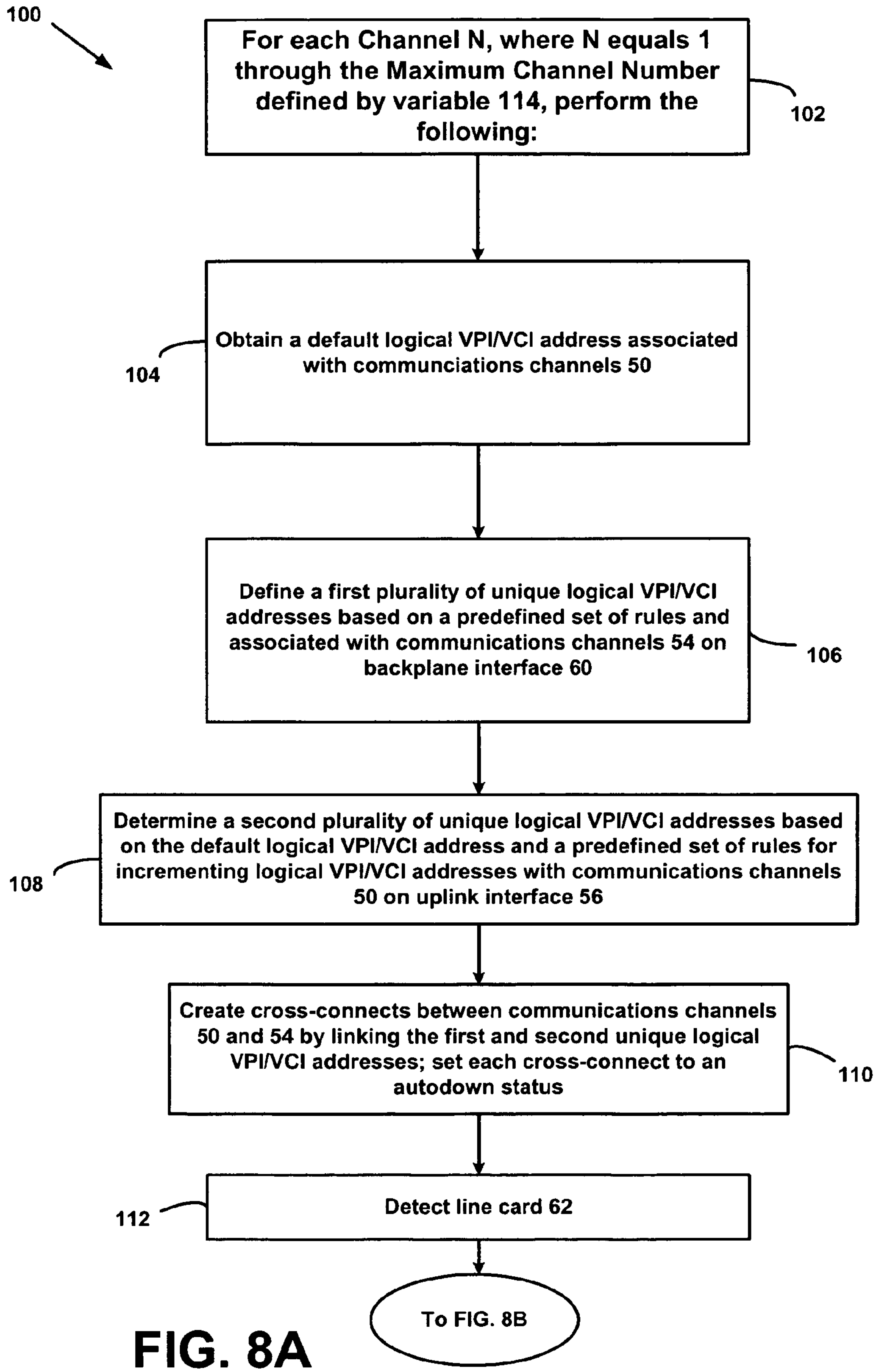
FIG. 8A is one portion of a flowchart illustrating the architecture, functionality, and operation of the management software in the switch concentration module of FIG. 7 according to the systems and methods of the present invention.
Figure 8B:
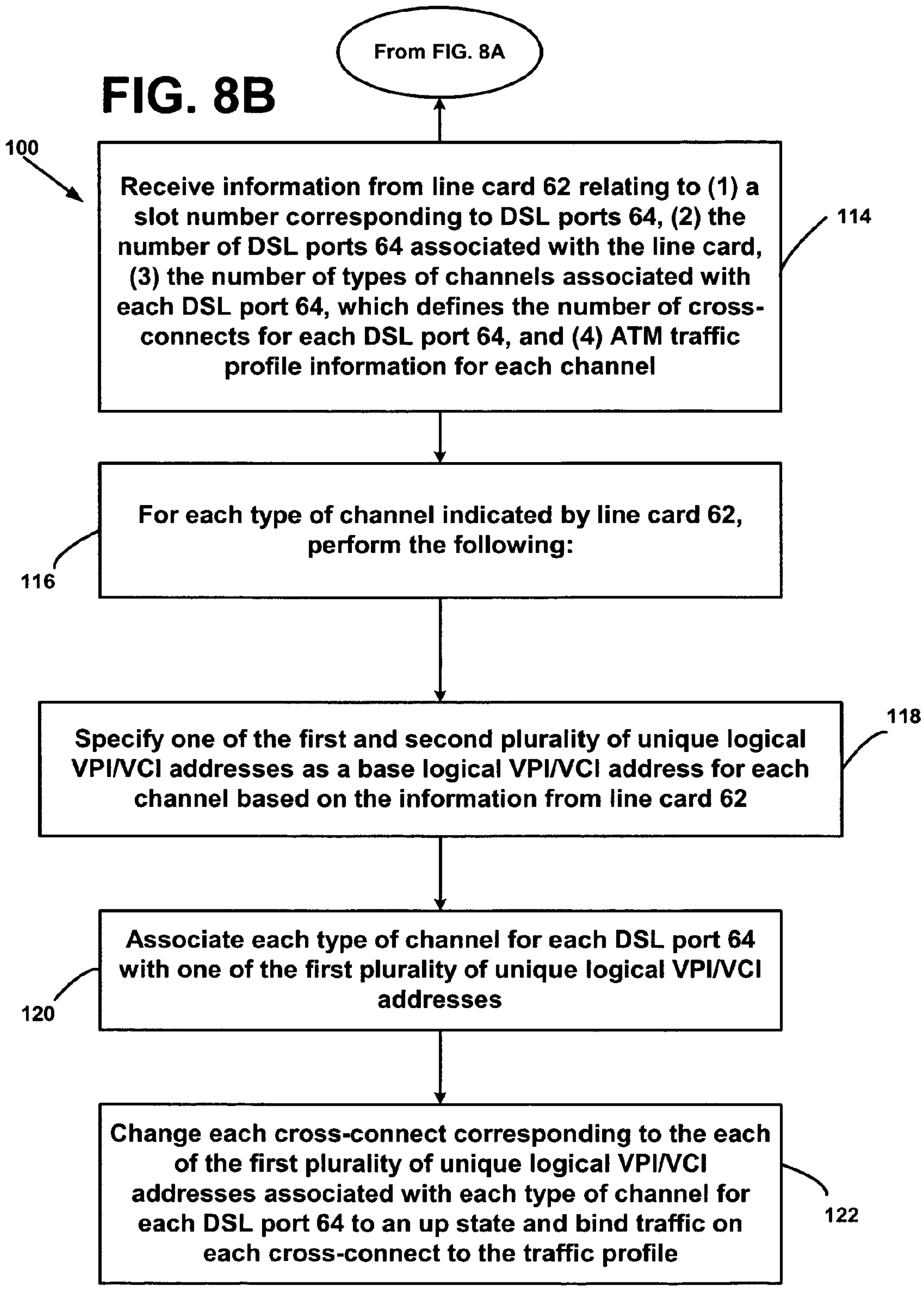
FIG. 8B is a second portion of a flowchart illustrating the architecture, functionality, and operation of the management software in the switch concentration module of FIG. 7 according to the systems and methods of the present invention.

FIGS. 8A and 8B illustrate the architecture, functionality, and operation of management software 100 in DSLAM 44 of FIG. 7. Block 102 specifies that for each type of channel N, where N equals 1 through a maximum channel number, the following steps are performed. The maximum number of types of channels may be a default value associated with management software 100 or it may be provisioned by management software 100 based on information received from user interface 92.

At block 104, a default logical VPI/VCI address is obtained, which may be associated with communications channels 50 on uplink interface 56 (FIG. 3). The default logical VPI/VCI address may be stored within management software 100 in memory 88 or it may be provisioned based on information received from user interface 92.

At block 106, a first plurality of unique logical VPI/VCI addresses are defined based on a predefined set of rules for, incrementing logical VPI/VCI addresses, which will be described below. The first plurality of unique logical VPI/VCI addresses may be associated with communications channels 54 on backplane interface 60 (FIG. 3).

At block 108, a second plurality of unique logical VPI/VCI addresses are determined based on the default logical VPI/VCI address and the predefined set of rules. The second plurality of unique logical VPI/VCI addresses may be associated with communications channels 50 and uplink interface 56.

At block 110, cross-connects are created between communications channels 50 and 54 by linking the first and second unique logical VPI/VCI addresses. Each of the cross-connects may be initialized to an autodown status. For example, in all known systems and methods, the cross-connects are typically administratively in an up or down status. In accordance with the systems and methods of the present invention, the automatically generated cross-connects are initialized to autodown, which signifies that the cross-connect has been automatically generated and does not have an association with a DSL port 64 or line card 62 (FIG. 3).

At blocks 112 and 114, a line card 62 is detected and information is received from line card 62. In the preferred embodiment, the information relates to (1) a slot number corresponding to DSL ports 64, (2) the number of DSL ports 64 associated with the line card 62, (3) the number of types of channels 54 (FIG. 3) associated with each DSL port 64, which defines the number of cross-connects for each DSL port 64, and (4) ATM traffic profile information for each channel 54.

Block 116 specifies that for each type of channel indicated by line card 62, the following steps are performed. At block 118, one of the first and second plurality of unique logical VPI/VCI addresses are specified as a base logical VPI/VCI address for each channel based on the information from line card 62.

At block 120, each type of channel 54 for each DSL port 64 is associated with one of the first plurality of unique logical VPI/VCI addresses. At block 122, the state of each cross-connect corresponding to each of the first plurality of unique logical VPI/VCI addresses associated with each type of channel for each DSL port 64 is changed to up and traffic on each cross-connect is bound to the traffic profile specified by line card 62.

For example, a line card 62 in slot #3 may call for one channel 54 with 24 DSL ports 64. Line card 62 may also call for unspecified bit rate (UBR) packet-based service. Based on this information, a base logical VPI/VCI address corresponding to VPI=0 and VCI=32 may be specified. Then the status of cross-connects corresponding to VPI=0 and VCI=32 through VPI=0 and VCI=55 are changed to up and the traffic on each is bound to UBR.

For a second example, a line card 62 in slot #8 may call for one channel 54 with 16 DSL ports 64 for carrying unspecified bit rate (UBR) packet traffic and another channel for carrying variable bit rate (VBR) voice traffic. Based on this information, a base logical VPI/VCI address corresponding to VPI=0 and VCI=32 may be specified for the packet channel and another corresponding to VPI=1 and VCI=32 may be specified for the voice channel. Then the cross-connects corresponding to VPI=0 and VCI=32 through VPI=0 and VCI=55 are allocated and the status of cross-connects corresponding to VPI=0 and VCI=32 through VPI=0 and VCI=47 are changed to up and the traffic on each is bound to UBR. The cross-connects corresponding to VPI=1 and VCI=32 through VPI=1 and VCI=55 are also allocated and the status of cross-corresponding to VPI=1 and VCI=32 through VPI=1 and VCI=47 are changed to up and the traffic on each is bound to VBR.

Although in the embodiment of SCM 58 described with respect to FIGS. 8A and 8B switching is done on both the VPI 74 and VCI 76 (VCC), the present invention is not limited as such. Instead, in accordance with the systems and methods of the present invention, switching may be done on VPI 74 (VPC) only. As appreciated by those of ordinary skill in the art, the systems and methods of the present invention may employed in either switching environment (VPC or VCC). Accordingly, the term "logical VPI/VCI address" used throughout, should be given a broad interpretation to acknowledge that the systems and methods of the present invention are not limited to a particular switching technique (VPC or VCC).

Management software 100 may be implemented in hardware, software, firmware, or a combination thereof. In the preferred embodiment, management software 100 is implemented in software or firmware that is stored in a memory and that is executed by a suitable instruction execution system, such as central processing unit 86. If implemented in hardware, as in an alternative embodiment, management software 100 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The flow charts of FIGS. 8A and 8B show the architecture, functionality, and operation of a possible implementation of management software 100 of FIG. 7. In this regard, each block represents a module, segment, or portion of code, which comprises one or more executable instructions for implementing the specified logical function(s). It should also be noted that in some alternative implementations, the functions noted in the blocks may occur out of the order noted in FIGS. 8A and 8B. For example, two blocks shown in succession in FIGS. 8A and 8B may in fact be executed substantially concurrently or the blocks may sometimes be executed in the reverse order, depending upon the functionality involved, as will be further clarified hereinbelow.

In one embodiment, management software 100 includes an uplink interface data module 130, cross-connect data module 132, backplane interface data module 134, VCL data module 136, a line card data module 138, an auto-configuration data module 140, and a DSL port data module 142 (FIG. 7).

Line card data module 138 may include information related to line cards 62, which may be received from backplane interface 60. FIG. 9 illustrates a line card data structure 144, which may be used for implementing a portion of management software 100 in FIG. 7. Line card data structure 144 may include a "slot #" variable 146, a "number of ports" variable 148, a "requested number of channels per port" variable 150, a "requested traffic profile indicator per channel" variable 152.

DSL port data module 142 may include information related to DSL ports 64 for line cards 62. FIG. 10 illustrates a DSL port data structure 154, which may be used for implementing another portion of management software 100 in FIG. 7. DSL port data structure 154 may include a "DSL port #" variable 156, a "max VPI" variable 158, a "max VCI" variable 160, a "status" variable 162, and a "configuration parameters" variable 164, including, for each DSL port 64, information related to the number of channels, ATM parameters, upstream and downstream rates, etc.

Backplane interface data module 134 may include information related to backplane interface 60, such as identifiers for each of the links for communications channels 54 in backplane interface 60 and VPI/VCI pairs for each channel associated with each of the links. FIG. 11 illustrates a backplane interface data structure 166, which may be used for implementing a further portion of management software 100 in FIG. 7. Backplane interface data structure 166 may include an "interface ID" variable 168, a "max VPI" variable 170, a "max VCI" variable 172, a "status" variable 174, and an "other parameters" variable 176.

Uplink interface data module 130 may include information related to uplink interface 56, such as identifiers for each of the links for communications channels 50 in uplink interface 56 and VPI/VCI pairs for each channel associated with each of the links. FIG. 12 illustrates an uplink interface data structure 178, which may be used for implementing another portion of management software 100 in FIG. 7. Uplink interface data structure 178 may include an "interface ID" variable 180, a "max VPI" variable 182, a "max VCI" variable 184, a "status" variable 186, and an "other parameters" variable 188.

Cross-connect data module 132 may include information defining a plurality of cross-connects between communications channels 54 and 50. FIG. 13 illustrates one embodiment of a cross-connect data structure 190 for a cross-connect table, which may be used for implementing a portion of management software 100 in FIG. 7. Cross-connect data structure 190 includes a "cross-connect ID" variable 192, a "IFIndex1" variable 194, a VPI1 variable 196, a VCI1 variable 200, a "IFIndex2" variable 202, a VPI2 variable 204, and a VCI2 variable 206. Cross-connect data structure 190 defines a particular cross-connect (cross-connect ID) and associates a connection on a particular interface (IFIndex1) having a particular logical VPI/VCI address (VPI1/VCI1) with another connection on a different interface (IFIndex2) having a different logical VPI/VCI address (VPI2/VCI2). For example, cross-connect 1 may associate a connection on uplink interface 60 having a VPI=0 and VCI=32 with another connection on backplane interface 60 having a VPI=1 and VCI=0.

FIGS. 14*a*–14*c* illustrate a cross-connection table 210 which may be used for implementing another portion of management software 100 in FIG. 7. Cross-connection table 210 may include a list of "uplink interface:VPI:VCI" values 212 associated with a list of "backplane interface:VPI:VCI" values 214 and a related list of "status" values 216. Values 212 may be VPI/VCI addresses corresponding to a first set of cross-connections which are calculated based on a default logical VPI/VCI address associated with the VPI/VCI address for communications channels 50. Values 214 may be VPI/VCI addresses corresponding to a second set of cross-connections which are associated with VPI/VCI addresses for each link on backplane interface 60.

For example, in the preferred embodiment, values 212 and 214 may be determined based on the following equation:

Where:

(1) p=number of ports per card, and p begins from 1;

(2) m=channel numbers, and m begins from 0;

(3) c=number of cards in system, and c begins from 1;

For values 214:

VPI=p

VCI=m

For values 212:

VPI=base VPI for m $VCI$=base $VCI$ for $m+(c-1)*p+(p-1)$

VCL data module 136 may include information associated with values 212 and 214 and actual VPI/VCI addresses associated with communications channels 50. FIG. 15 illustrates a VCL data structure 220, which may be used for implementing a related portion of management software 100 in FIG. 7. VCL data structure 220 may include a "IFIndex" variable 222, a VPI variable 224, a VCI variable 226, a "traffic profile up" variable 228, and a "traffic profile down" variable 230.

Auto-configuration data module 140 may include information related to a default logical VPI/VCI address associated with the VPI!VCI addresses for communications channels 50. FIG. 16 illustrates an auto-configuration record 232, which may be used for implementing another portion of management software 100 in FIG. 7. Auto-configuration record 232 may include an "interface ID" variable 234, a "channel" variable 236, a "base VPI" variable 238, and a "base VCI" variable 240.

Figure 17:
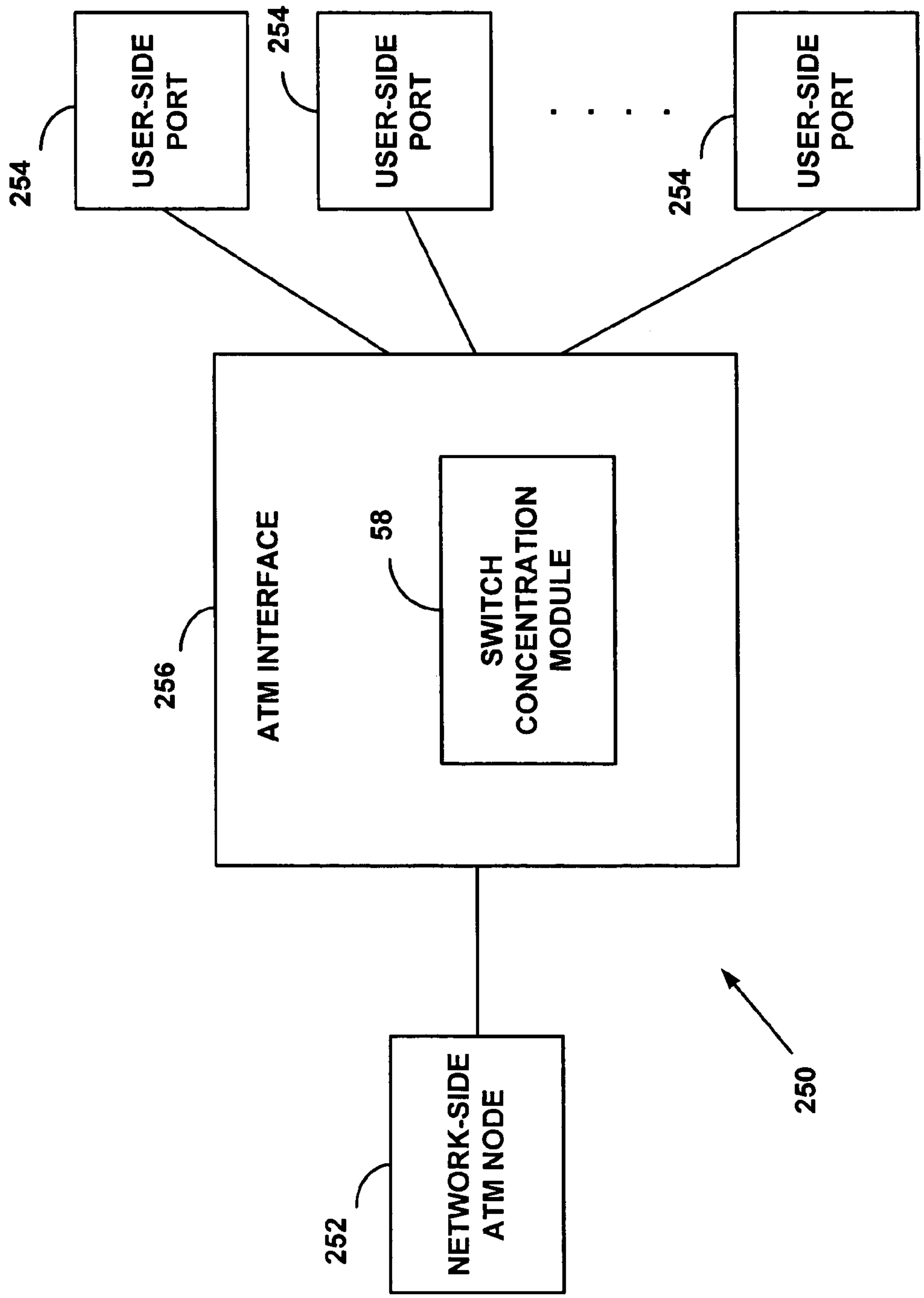
FIG. 17 is a block diagram illustrating an alternative embodiment of a system for implementing the present invention.

FIG. 17 illustrates a system 250 in which an alternative embodiment of SCM 58 of FIG. 7 may be implemented according to the systems and methods of the present invention. System 250 comprises a network-side ATM node 252, user-side ports 254, and an ATM interface 256. ATM interface 256 is coupled to ATM node 252 and the user-side ports 254. ATM node 252 provides multiple communications channels to ATM interface 256 and user-side ports 254 are also configured to receive multiple communications channels. Similar to communications channels 50 and 54 with respect to system 20, there may be multiple types of channels associated with the communications channels. ATM interface 256 comprises SCM 58 (FIG.3).

Figure 18A:
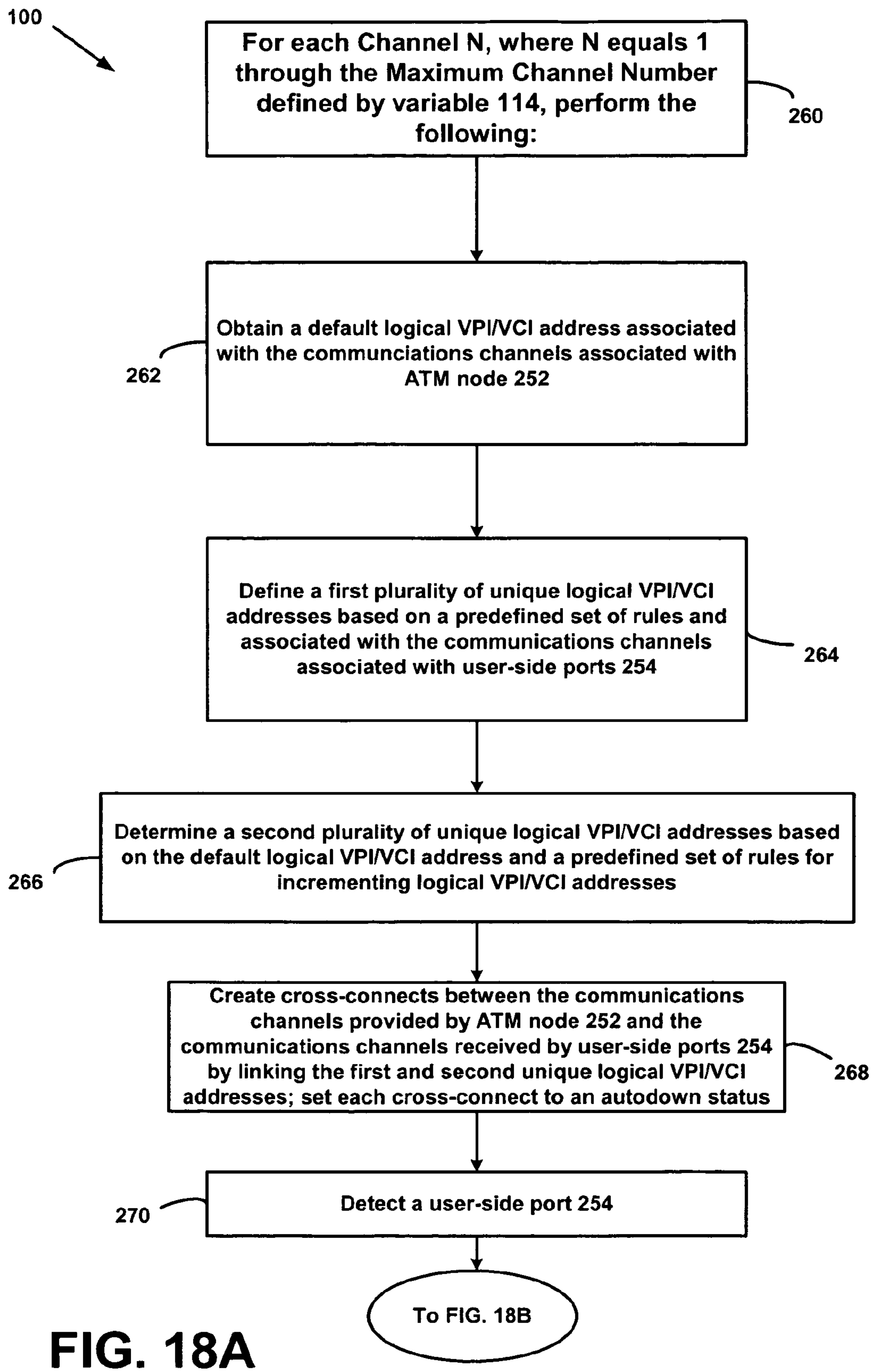
FIG. 18A is one portion of a flowchart illustrating the architecture, functionality, and operation of the management software in the switch concentration module of FIG. 17 according to the systems and methods of the present invention.
Figure 18B:
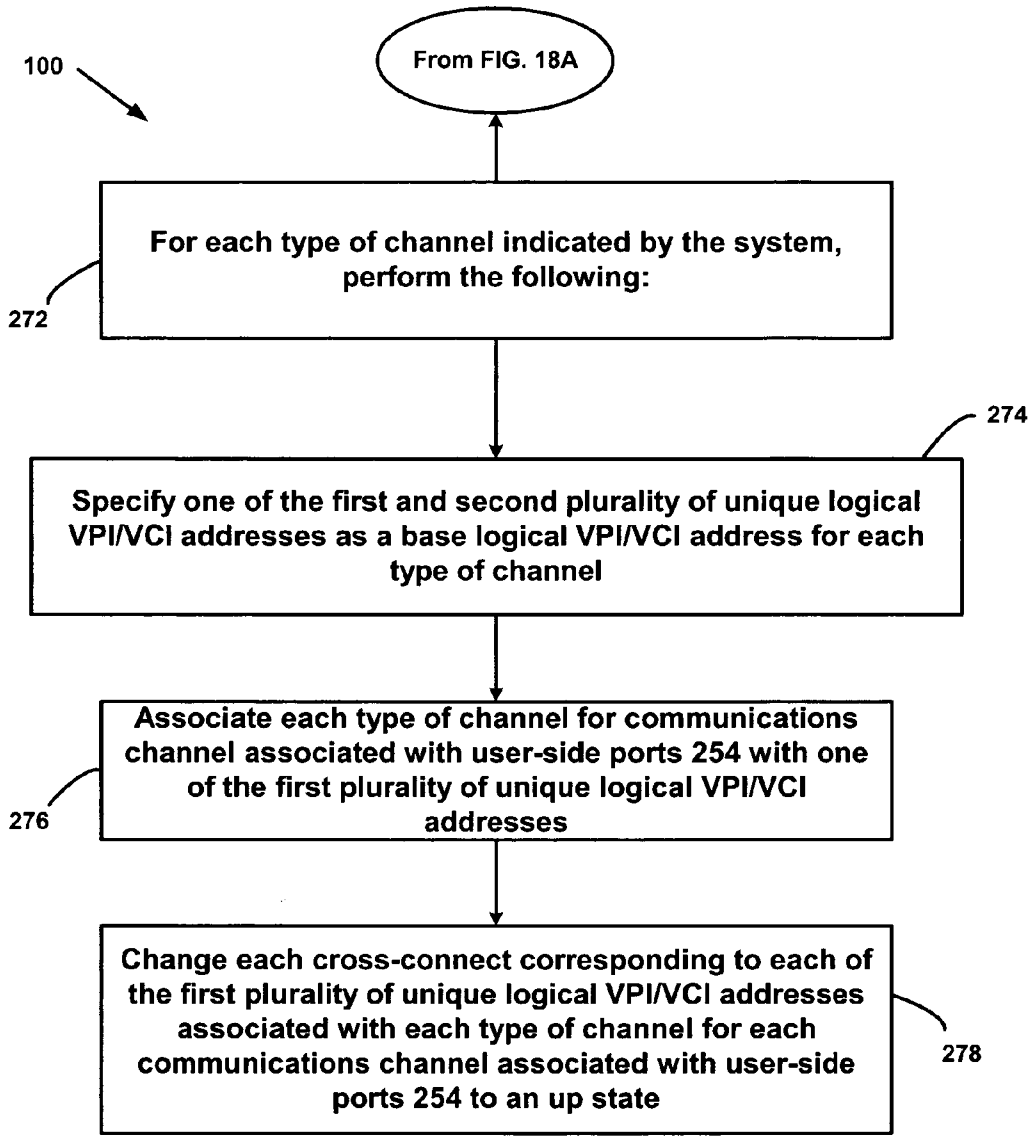
FIG. 18B is a second portion of a flowchart illustrating the architecture, functionality, and operation of the management software in the switch concentration module of FIG. 17 according to the systems and methods of the present invention.

FIGS. 18A and 18B illustrate the architecture, functionality, and operation of an alternative embodiment of management software 100 in SCM 58 of FIG. 17. Block 260 specifies that for each type of channel N, where N equals 1 through a maximum channel number, the following steps are performed. The maximum number of types of channels may be a default value associated with management software 100 or it may be provisioned by management software 100 based on information received from user interface 92.

At block 262, a default logical VPI/VCI address is obtained, which may be associated with the communications channels corresponding to ATM node 252. The default logical VPI/VCI address may be stored within management software 100 in memory 88 or received from user interface 92.

At block 264, a first plurality of unique logical VPI/VCI addresses are defined based on a predefined set of rules for incrementing logical VPI/VCI addresses, which will be described below. The first plurality of unique logical VPI/VCI addresses may be associated with the communications channels associated with user-side ports 254.

At block 266, a second plurality of unique logical VPI/VCI addresses are determined based on the default logical VPI/VCI address and the predefined set of rules. The second plurality of unique logical VPI/VCI addresses may be associated with the communications channels corresponding to ATM node 252.

At block 268, cross-connects are created between the communications channels provided from ATM node 252 and the communications channels received by user-side ports 254 by linking the first and second unique logical VPI/VCI addresses. Each of the cross-connects may be initialized to an autodown status, which signifies that the cross-connect has been automatically generated and does not have an association with a particular user-side port 254.

At block 270 a user-side port 254 is detected. Block 272 specifies that for each type of channel indicated in the system, the following steps are performed. At block 274, one of the first and second plurality of unique logical VPI/VCI addresses are specified as a base logical VPI/VCI address for each type of channel.

At block 276, each type of channel for each communications channel associated with user-side ports 254 is associated with one of the first plurality of unique logical VPI/VCI addresses. At block 278, the state of each cross-connect corresponding to each of the first plurality of unique logical VPI/VCI addresses associated with each type of channel for each communication channel associated with user-side ports 254 is changed to an up status.

Management software 100, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A digital subscriber line access multiplexer comprising:

a. a means for receiving a plurality of data communications channels;

b. a means for receiving a plurality of digital subscriber line communications channels, wherein the plurality of data communications channels and the plurality of digital subscriber line communications channels are adapted to carry asynchronous transfer mode traffic;

c. a means for automatically configuring a plurality of cross-connects between the plurality of data communications channels and the plurality of digital subscriber line communications channels, wherein the means for automatically configuring a plurality of cross-connects comprises:

d. a means for obtaining a default logical VPI/VCI address associated with the plurality of data communications channels;

e. a means for defining a first plurality of unique logical VPI/VCI addresses based on a predefined set of rules for incrementing logical VPI/VCI addresses, each of the first plurality of unique logical VPI/VCI addresses associated with one of the plurality of digital subscriber line communications channels;

f. a means for determining a second plurality of unique logical VPI/VCI addresses based on the default logical VPI/VCI address and the predefined set of rules; and g. a means for creating signal connectivity between the plurality of data communications channels and the plurality of digital subscriber line communications channels by linking the first and second unique logical VPI/VCI addresses.

2. The multiplexer of claim 1, wherein each of the plurality of cross-connects are defined as being in an autodown state.

3. The multiplexer of claim 2, further comprising a means for detecting a line card having a plurality of digital subscriber line ports, each of the plurality of digital subscriber line ports associated with one of a portion of the plurality of digital subscriber line communications channels and receiving information associated with the line card.

4. The multiplexer of claim 3, wherein the information relates to (i) a slot number corresponding to the line card, (ii) the number of digital subscriber line ports associated with the line card, (iii) the number of types of channels associated with each of the plurality of digital subscriber line ports, which defines the number of cross-connects corresponding to each of the plurality of digital subscriber line ports, and (iv) traffic profile information related to each of the types of channels.

5. The multiplexer of claim 4, further comprising a means for specifying one of the first and second plurality of unique logical VPI/VCI addresses as a base logical VPI/VCI address for each of the types of channels based on the information.

6. The multiplexer of claim 5, further comprising a means for associating each type of channel for each digital subscriber line port with one of the first plurality of unique logical VPI/VCI addresses.

7. The multiplexer of claim 6, further comprising a means for changing each of the plurality of cross-connects corresponding to each of the first plurality of unique logical VPI/VCI addresses associated with each type of channel for each digital subscriber line port to an up state.

8. The multiplexer of claim 7, further comprising a means for controlling the type of data traffic carried on each of the plurality of cross-connects corresponding to each of the first plurality of unique logical VPI/VCI addresses associated with each type of channel for each subscriber line port based on the traffic profile information for each of the types of channels.

9. A digital subscriber line access multiplexer for providing signal connectivity between a plurality of digital subscriber line communications channels and a plurality of data communications channels, each of the plurality of data communications channels and the plurality of digital subscriber line communications channels adapted to carry asynchronous transfer mode traffic, comprising:

a. a plurality of line cards, each line card having a plurality of digital subscriber line ports, each of the plurality of digital subscriber line ports capable of carrying a plurality of channels and adapted to communicate with one of the plurality of digital subscriber line communications channels;

b. a backplane interface having a first plurality of virtual circuit links, each of the first plurality of virtual circuit links adapted to communicate with each of the plurality of channels on each of the plurality of digital subscriber line ports;

c. an uplink interface having a second plurality of virtual circuit links, each of the second plurality of virtual circuit links adapted to communicate with one of the plurality of data communications channels; and d. a switch concentration module for automatically configuring a plurality of cross-connects between the first and second plurality of virtual circuit links.

10. The multiplexer of claim 9, wherein the switch concentration module comprises:

a. memory containing instructions for automatically configuring the plurality of cross-connects and adapted to receive information from the uplink interface and the backplane interface;

b. a computer processing unit for implementing the instructions and controlling receipt of the information from the uplink interface and the backplane interface; and c. a local interface connecting the computer processing unit, the memory, the uplink interface, and the backplane interface.

11. The multiplexer of claim 10, wherein the instructions instruct the central processing unit to (i) obtain a default logical VPI/VCI address associated with the plurality of data communications channels on the uplink interface, (ii) define a first plurality of unique logical VPI/VCI addresses based on a predefined set of rules for incrementing logical VPI/VCI addresses, each of the first plurality of unique logical VPI/VCI addresses associated with one of the plurality of digital subscriber line communications channels on the backplane interface, (iii) determine a second plurality of unique logical VPI/VCI addresses based on the default logical VPI/VCI address and the predefined set of rules, and (iv) create a plurality of cross-connects between the plurality of data communications channels and the plurality of digital subscriber line communications channels by linking the first and second unique logical VPI/VCI addresses.

12. The multiplexer of claim 11, wherein each of the plurality of cross-connects are defined as being in an autodown state.

13. The multiplexer of claim 12, wherein the instructions further instruct the central processing unit to (i) detect a line card having a plurality of digital subscriber line ports, each of the plurality of digital subscriber line ports associated with one of a portion of the plurality of digital subscriber line communications channels and (ii) receive information associated with the line card.

14. The multiplexer of claim 13, wherein the information relates to (i) a slot number corresponding to the line card, (ii) the number of digital subscriber line ports associated with the line card, (iii) the number of types of channels associated with each of the plurality of digital subscriber line ports, which defines the number of cross connects corresponding to each of the plurality of digital subscriber line ports, and (iv) traffic profile information related to each of the types of channels.

15. The multiplexer of claim 14, wherein the instructions further instruct the central processing unit to specifying one of the first and second plurality of unique logical VPI/VCI addresses as a base logical VPI/VCI address for each of the types of channels based on the information.

16. The multiplexer of claim 17, wherein the instructions further instruct the central processing unit to associate each type of channel for each digital subscriber line port with one of the first plurality of unique logical VPI/VCI addresses.

17. The multiplexer of claim 16, wherein the instructions further instruct the central processing unit to change each of the plurality of cross-connects corresponding to each of the first plurality of unique logical VPI/VCI addresses associated with each type of channel for each digital subscriber line port to a up state.

18. The multiplexer of claim 17, wherein the instructions further instruct the central processing unit to control the type of data traffic carried on each of the plurality of cross-connects corresponding to each of the first plurality of unique logical VPI/VCI pairs associated with each type of channel for each subscriber line port based on the traffic profile information related to each of the types of channels.

19. A method for automatically configuring a plurality of cross connects in a digital subscriber line access multiplexer between a plurality of digital subscriber line communications channels and a plurality of data communications channels, the method comprising:

a. obtaining a default logical VPI/VCI address associated with the plurality of data communications channels;

b. defining a first plurality of unique logical VPI/VCI addresses based on a predefined set of rules for incrementing logical VPI/VCI addresses, each of the first plurality of unique logical VPI/VCI addresses associated with one of the plurality of digital subscriber line communications channels;

c. determining a second plurality of unique logical VPI/VCI addresses based on the default logical VPI/VCI address and the predefined set of rules; and d. creating a plurality of cross-connects between the plurality of data communications channels and the plurality of digital subscriber line communications channels by linking the first and second unique logical VPI/VCI addresses.

20. The method of claim 19, further comprising providing signal connectivity between a plurality of digital subscriber line communications channels and a plurality of data communications channels, each of the plurality of digital subscriber line communications channels and each of the plurality of data communications channels adapted to carry asynchronous transfer mode data.

21. The method of claim 19, wherein each of the plurality of cross-connects are defined as being in an autodown state.

22. The method of claim 21, further comprising detecting a line card having a plurality of digital subscriber line ports, each of the plurality of digital subscriber line ports associated with one of a portion of the plurality of digital subscriber line communications channels and receiving information associated with the line card.

23. The method of claim 22, wherein the information relates to (i) a slot number corresponding to the line card, (ii) the number of digital subscriber line ports associated with the line card, (iii) the number of types of channels associated with each of the plurality of digital subscriber line ports, which defines the number of cross connects corresponding to each of the plurality of digital subscriber line ports, and (iv) traffic profile information related to each of the types of channels.

24. The method of claim 23, further comprising specifying one of the first and second plurality of unique logical VPI/VCI addresses as a base logical VPI/VCI address for each of the types of channels based on the information.

25. The method of claim 24, further comprising associating each type of channel for each digital subscriber line port with one of the first plurality of unique logical VPI/VCI addresses.

26. The method of claim 25, further comprising changing each of the plurality of cross-connects corresponding to each of the first plurality of unique logical VPI/VCI addresses associated with each type of channel for each digital subscriber line port to an up state.

27. The method of claim 26, further comprising controlling the type of data traffic carried on each of the plurality of cross-connects corresponding to each of the first plurality of unique VPI/VCI pairs associated with each type of channel for each subscriber line port based on the traffic profile information related to each of the types of channels.

28. A computer-readable medium having a computer program for use by a digital subscriber line access multiplexer for automatically configuring a plurality of cross-connects between a plurality of data communications channels and a plurality of digital subscriber line communications channels, the computer-readable medium comprising:

a. a first portion of code for obtaining a default logical VPI/VCI address associated with the plurality of data communications channels;

b. a second portion of code for defining a first plurality of unique logical VPI/VCI addresses based on a predefined set of rules for incrementing logical VPI/VCI addresses, each of the first plurality of unique logical VPI/VCI addresses associated with one of the plurality of digital subscriber line communications channels;

c. a third portion of code for determining a second plurality of unique logical VPI/VCI addresses based on the default logical VPI/VCI address and the predefined set of rules; and d. a fourth portion of code for creating a plurality of cross-connects between the plurality of data communications channels and the plurality of digital subscriber line communications channels by linking the first and second unique logical VPI/VCI addresses.

29. The computer-readable medium of claim 28, wherein each of the plurality of cross-connects are defined as being in an autodown state.

30. The computer-readable medium of claim 29, further comprising a fifth portion of code for detecting a line card having a plurality of digital subscriber line ports, each of the plurality of digital subscriber line ports associated with one of a portion of the plurality of digital subscriber line communications channels and receiving information associated with the line card.

31. The computer-readable medium of claim 30, wherein the information relates to (i) a slot number corresponding to the line card, (ii) the number of digital subscriber line ports associated with the line card, (iii) the number of types of channels associated with each of the plurality of digital subscriber line ports, which defines the number of cross connects corresponding to each of the plurality of digital subscriber line ports, and (iv) traffic profile information related to each of the types of channels.

32. The computer-readable medium of claim 31, further comprising a sixth portion of code for specifying one of the first and second plurality of unique logical VPI/VCI addresses as a base logical VPI/VCI address for each of the types of channels based on the information.

33. The computer-readable medium of claim 32, further comprising a seventh portion of code for associating each type of channel for each digital subscriber line port with one of the first plurality of unique logical VPI/VCI addresses.

34. The computer-readable medium of claim 33, further comprising an eighth portion of code for changing each of the plurality of cross-connects corresponding to each of the first plurality of unique logical VPI/VCI addresses associated with each type of channel for each digital subscriber line port to an up state.

35. The computer-readable medium of claim 34, further comprising a ninth portion of code for controlling the type of data traffic carried on each of the plurality of cross-connects corresponding to each of the first plurality of unique VPI/VCI addresses associated with each type of channel for each subscriber line port based on the traffic profile information related to each of the types of channels.

36. An ATM switch comprising:

a. a means for receiving a plurality of network-side communications channels;

b. a means for receiving a plurality of user-side communications channels; and c. a means for automatically configuring a plurality of cross-connects between the plurality of network-side communications channels and the plurality of user-side communications channels, wherein the means for automatically configuring a plurality of cross-connects comprises:

d. a means for obtaining a default logical VPI/VCI address associated with the plurality of network-side communications channels;

e. a means for defining a first plurality of unique logical VPI/VCI addresses based on a predefined set of rules for incrementing logical VPI/VCI addresses, each of the first plurality of unique logical VPI/VCI addresses associated with one of the plurality of user-side communications channels;

f. a means for determining a second plurality of unique logical VPI/VCI addresses based on the default logical VPI/VCI address and the predefined set of rules; and g. a means for creating signal connectivity between the plurality of network-side communications channels and the plurality of user-side communications channels by linking the first and second unique logical VPI/VCI addresses.

37. The switch of claim 36, wherein each of the plurality of cross-connects are defined as being in an autodown state.

38. The switch of claim 37, further comprising a means for detecting a user port, the user port associated with one of a portion of the plurality of user-side communications channels.

39. The switch of claim 38, further comprising a means for specifying one of the first and second plurality of unique logical VPI/VCI addresses as a base logical VPI/VCI address for each of a plurality of types of channels.

40. The switch of claim 39, further comprising a means for associating each type of channel for the user port with one of the first plurality of unique logical VPI/VCI addresses.

41. The switch of claim 40, further comprising a means for changing each of the plurality of cross-connects corresponding to each of the first plurality of unique logical VPI/VCI addresses associated with each type of channel for the user port to an up state.

42. An ATM switch for providing signal connectivity between a plurality of network-side communications channels and a plurality of user-side communications channels, comprising:

a. a plurality of user ports, each of the plurality of user ports capable of carrying a plurality of channels and adapted to communicate with one of the plurality of user-side communications channels;

b. a backplane interface having a first plurality of virtual circuit links, each of the first plurality of virtual circuit links adapted to communicate with each of the plurality of channels on each of the plurality of user ports;

c. an uplink interface having a second plurality of virtual circuit links, each of the second plurality of virtual circuit links adapted to communicate with one of the plurality of network-side communications channels; and d. a switch concentration module for automatically configuring a plurality of cross-connects between the first and second plurality of virtual circuit links.

43. The switch of claim 42 wherein the switch concentration module comprises:

a. memory containing instructions for automatically configuring the plurality of cross-connects and adapted to receive information from the uplink interface and the backplane interface;

b. a computer processing unit for implementing the instructions and controlling receipt of the information from the uplink interface and the backplane interface; and c. a local interface connecting the computer processing unit, the memory, the uplink interface, and the backplane interface.

44. The switch of claim 10 wherein the instructions instruct the central processing unit to (i) obtain a default logical VPI/VCI address associated with the plurality of data communications channels on the uplink interface, (ii) define a first plurality of unique logical VPI/VCI addresses based on a predefined set of rules for incrementing logical VPI/VCI addresses, each of the first plurality of unique logical VPI/VCI addresses associated with one of the plurality of user-side communications channels on the backplane interface, (iii) determine a second plurality of unique logical VPI/VCI addresses based on the default logical VPI/VCI address and the predefined set of rules, and (iv) create a plurality of cross-connects between the plurality of network-side communications channels and the plurality of user-side communications channels by linking the first and second unique logical VPI/VCI addresses.

45. The switch of claim 44 wherein each of the plurality of cross-connects are defined as being in an autodown state.

46. The switch of claim 45, wherein the instructions further instruct the central processing unit to specify one of the first and second plurality of unique logical VPI/VCI addresses as a base logical VPI/VCI address for each of the types of channels.

47. The switch of claim 46, wherein the instructions further instruct the central processing unit to associate each type of channel for each user port with one of the first plurality of unique logical VPI/VCI addresses.

48. The switch of claim 47, wherein the instructions further instruct the central processing unit to change each of the plurality of cross-connects corresponding to each of the first plurality of unique logical VPI/VCI addresses associated with each type of channel for each user port to an up state.

49. A method for automatically configuring a plurality of cross-connects in an ATM switch between a plurality of network-side communications channels and a plurality of user-side communications channels, the method comprising:

a. obtaining a default logical VPI/VCI address associated with the plurality of network-side communications channels;

b. defining a first plurality of unique logical VPI/VCI addresses based on a predefined set of rules for incrementing logical VPI/VCI addresses, each of the first plurality of unique logical VPI/VCI addresses associated with one of the plurality of user-side communications channels;

c. determining a second plurality of unique logical VPI/VCI addresses based on the default logical VPI/VCI address and the predefined set of rules; and d. creating a plurality of cross-connects between the plurality of network-side communications channels and the plurality of user-side communications channels by linking the first and second unique logical VPI/VCI addresses.

50. The method of claim 49, further comprising providing signal connectivity between a plurality of user-side communications channels and a plurality of network-side communications channels, each of the plurality of user-side communications channels and each of the plurality of network-side communications channels adapted to carry asynchronous transfer mode data.

51. The method of claim 49, wherein each of the plurality of cross-connects are defined as being in an autodown state.

52. The method of claim 51, further comprising detecting a plurality of user ports, each of the plurality of user ports associated with one of a portion of the plurality of user-side channels.

53. The method of claim 52, further comprising specifying one of the first and second plurality of unique logical VPI/VCI addresses as a base logical VPI/VCI address for each of a plurality of types of channels.

54. The method of claim 53, further comprising associating each type of channel for each user port with one of the first plurality of unique logical VPI/VCI addresses.

55. The method of claim 54, further comprising changing each of the plurality of cross-connects corresponding to each of the first plurality of unique logical VPI/VCI addresses associated with each type of channel for each user port to an up state.

56. A computer-readable medium having a computer program for use by an ATM switch for automatically configuring a plurality of cross-connects between a plurality of network-side communications channels and a plurality of user-side communications channels, the computer-readable medium comprising:

a. a first portion of code for obtaining a default logical VPI/VCI address associated with the plurality of network-side communications channels;

b. a second portion of code for defining a first plurality of unique logical VPI/VCI addresses based on a predefined set of rules for incrementing logical VPI/VCI addresses, each of the first plurality of unique logical VPI/VCI addresses associated with one of the plurality of user-side communications channels;

c. a third portion of code for determining a second plurality of unique logical VPI/VCI addresses based on the default logical VPI/VCI address and the predefined set of rules; and d. a fourth portion of code for creating a plurality of cross-connects between the plurality of network-side communications channels and the plurality of user-side communications channels by linking the first and second unique logical VPI/VCI addresses.

57. The computer-readable medium of claim 56, wherein each of the plurality of cross-connects are defined as being in an autodown state.

58. The computer-readable medium of claim 57, further comprising a fifth portion of code for detecting a plurality of user ports, each of the plurality of user ports associated with one of a portion of the plurality of user-side communications channels.

59. The computer-readable medium of claim 58, further comprising a sixth portion of code for specifying one of the first and second plurality of unique logical VPI/VCI addresses as a base logical VPI/VCI address for each of the types of channels.

60. The computer-readable medium of claim 59, further comprising a seventh portion of code for associating each type of channel for each user port with one of the first plurality of unique logical VPI/VCI addresses.

61. The computer-readable medium of claim 60, further comprising an eighth portion of code for changing each of the plurality of cross-connects corresponding to each of the first plurality of unique logical VPI/VCI addresses associated with each type of channel for each user port to an up state.

62. The method of claim 20, further comprising:

a. receiving the plurality of data communications channels;

b. receiving the plurality of digital subscriber line communications channels; and c. automatically configuring a plurality of asynchronous transfer mode cross-connects between the plurality of data communications channels and the plurality of digital subscriber line communications channels.

63. The method of claim 50, further comprising:

a. receiving the plurality of network-side communications channels;

b. receiving the plurality of user-side communications channels; and c. automatically configuring a plurality of asynchronous transfer mode cross-connects between the plurality of network-side communications channels and the plurality of user-side communications channels.

* * * * *

UNITED STATES PATENT AND TRADEMARK OFFICE

CERTIFICATE OF CORRECTION

PATENT NO. : 6,977,922 B2
DATED : December 20, 2005
INVENTOR(S) : Blanset et al.

It is certified that error appears in the above-identified patent and that said Letters Patent is hereby corrected as shown below:

Column 5,
Line 47, delete “Tn” and insert -- In --.

Column 8,
Line 24, delete “FIG. 5.)”.

Column 12,
Line 17, delete “VPI!VCI” and insert -- VPI/VCI --.

Column 16,
Line 9, delete “17” and insert -- 15, --.

Signed and Sealed this

Sixth Day of June, 2006

JON W. DUDAS
*Director of the United States Patent and Trademark Office*